United States Patent [19]

Westbrook

[11] 3,906,786

[45] Sept. 23, 1975

[54] OVERLOAD PROTECTOR FOR TORQUEMETER

[75] Inventor: Carl M. Westbrook, Beloit, Wis.

[73] Assignee: The Weatherhead Company, Cleveland, Ohio

[22] Filed: Apr. 15, 1974

[21] Appl. No.: 460,799

[52] U.S. Cl. .............................................. 73/136 A
[51] Int. Cl.² ........................................ G01L 3/04
[58] Field of Search ................... 73/136 A, 388 BN; 33/DIG. 2

[56] References Cited
UNITED STATES PATENTS

| | | | |
|---|---|---|---|
| 2,451,451 | 10/1948 | Tate | 73/388 BN X |
| 3,014,372 | 12/1961 | Hallett | 73/388 BN X |
| 3,069,902 | 12/1962 | Crosby | 73/136 A |
| 3,273,387 | 9/1966 | Westbrook et al. | 73/136 A |
| 3,710,618 | 1/1973 | Pagel | 73/136 A |

Primary Examiner—Charles A. Ruehl
Attorney, Agent, or Firm—McNenny, Farrington, Pearne & Gordon

[57] ABSTRACT

A torque sensing instrument is disclosed which detects angular deflection of a shaft to determine torque imposed thereon. The sensing instrument includes a nozzle member positioned to direct fluid in a direction substantially tangentially of the shaft axis and an anvil member spaced a predetermined distance from and facing the nozzle member for impeding flow therefrom. Those members are moved toward each other as a function of torsional load imposed on the shaft. A fluid under constant pressure is delivered to the nozzle member and variations in pressure caused by a change in distance between nozzle and anvil members are detected to indicate torsional forces on the shaft. The anvil member includes a displaceable portion, such as a thinned neck section, which permits overload movement of the members toward each other beyond the predetermined initial distance to prevent deformation or damage to the nozzle member.

3 Claims, 3 Drawing Figures

OVERLOAD PROTECTOR FOR TORQUEMETER

BACKGROUND OF THE INVENTION

This invention relates to torquemeters for sensing or measuring torque transmitted by a rotating shaft and, more particularly, to a torquemeter having a displaceable element which permits torque overload without substantial damage to the meter.

There exist many types of torquemeters which sense or measure the rotational deflection produced in a predetermined length of a torque transmitting shaft of known torsional characteristics. Many of those torquemeters employ the principle of sensing or measuring such deflection by means of a technique commonly referred to as "pneumatic gauging," in which the spacing between an orifice of an air nozzle member and a confronting restrictor surface or anvil determines the flow resistance of the nozzle member. By supplying air to the nozzle at a constant predetermined pressure, variations in flow through the orifice are an indication of the particular spacing. In torque sensing instruments, the nozzle member is mounted on the shaft of a torque sensing unit, with its orifice directed in tangential relation thereto in close confronting proximity to the flow restricting surface of a restrictor member supported at a different axial location along the shaft. Thus, the torsional deflection of the segment of the shaft between the elements respectively supporting the nozzle and restrictor members manifests itself in the spacing of the air nozzle orifice from the restrictor surface. Examples of such torquemeters may be found in U.S. Pat. Nos. 3,710,618; 3,069,902; 3,273,387; and 2,491,251.

One problem associated with such torque sensing devices is damage caused by accidental overload beyond the rated capacity of the torquemeter. As is pointed out in U.S. Pat. No. 3,710,618, the reference surfaces of the nozzle and restrictor members must be quite close together to obtain maximum measured accuracy and must move relative to each other through a correspondingly small distance. For example, in a typical torque sensing unit, the confronting reference surfaces might be spaced from each other by about 0.002 inch when the unit is free from torsional forces and by about 0.001 inch when the unit is subjected to maximum torque which it is intended to measure. Thus, that unit could be subjected to approximately twice its maximum rated torque load before the reference surfaces would come into contact with each other. However, if the sensing unit were to be subjected to a torsional overload sufficient to drive the reference surfaces together, the accuracy of the instrument would almost certainly be destroyed, particularly if the torsional forces involved were sufficient to produce irreversible twisting of the shaft member. Such damage or other damage resulting in permanent deformation of torquemeter parts necessitates the replacement of expensive parts or replacement of the entire unit.

SUMMARY OF THE INVENTION

This invention overcomes this prior art problem by providing a torquemeter which has the desired close spacing between the confronting reference surfaces but permits excessively high overloads without damage to expensive components of the torquemeter. This is accomplished by providing a replaceable and displaceable nozzle member and/or anvil member to permit a far greater overload than prior art torque sensing instruments without causing substantial damage to the instrument.

Specifically, this is accomplished by providing a torque sensing instrument which includes a torsion shaft provided with a nozzle member fixed to the shaft at one location and an anvil member fixed to the shaft at another location, but having a face closely spaced with respect to the nozzle member. Variations in torsional loads imposed on the shaft cause variations in spacing between the anvil and the nozzle member. Fluid is delivered under constant pressure to the nozzle member and the variations in spacing between the members cause variations in pressure and those variations may be sensed and read-out as torsional values. While the spacing between the orifice and the anvil member corresponds to the desired and necessary spacing to produce variations in pressure values, the members may be moved into contact under an overload condition and then may be moved considerably beyond that position so that at least one of the members is physically displaced or distorted. Since at least one of the members is replaceable, however, permanent damage to the torquemeter is obviated. According to a preferred aspect of this invention, the anvil member may comprise a projecting end of a screw having a thinned neck portion. Upon contact of the anvil member by the nozzle under overload conditions, the thinned neck portion is collapsed as the nozzle progressively bears against the anvil. Although the anvil member is destroyed in this manner, it may be easily replaced.

DETAILED DESCRIPTION OF THE INVENTION

Figure 1:
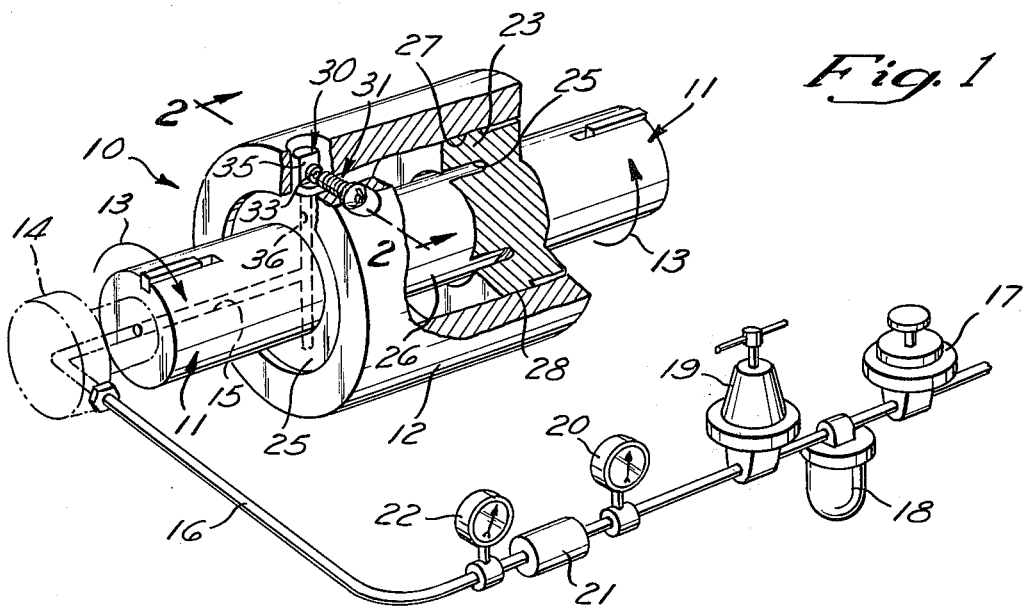
FIG. 1 is a perspective view, partly in section, of a torque sensing instrument according to this invention.

Referring now to the drawing, there is illustrated a torque sensing instrument 10 which includes a shaft 11 and a tubular sleeve 12. In a typical application, the shaft 11 is rotatably supported by appropriate bearings and serves to transmit power between input and output power transmission members, e.g., between gears mounted at opposite ends of the shaft. For purposes of clarity, however, such bearings and power transmission members have been omitted from the drawing, in which the opposing torsional forces acting on the power input and power output ends of the shaft are illustrated by arrows 13 in FIG. 1. These opposed torsional forces produce a slight twist in the shaft which is measured along a predetermined central segment of the shaft to determine the amount of torque being transmitted by the torque sensing unit.

One end of the shaft member is provided with a rotary seal 14 (shown in phantom outline) which is adapted to establish an airtight connection between a central passageway 15 in the shaft and a conduit 16 connected to a source of compressed air, not shown. Between the source of compressed air and the rotary seal, the conduit includes an adjustable primary pressure regulator 17, a filter and moisture trap 18, a precision pressure regulator 19, a pressure gauge 20 which measures the regulated pressure, a master orifice 21, and a torque read-out gauge 22. The air pressure indicated by the gauge 22 is therefore functionally related to the rate at which air escapes from the passageway 15 through the torque sensing unit, which is determined by the torque experienced by that unit as described in detail below. Accordingly, the gauge 22 can be calibrated in torsional units, such as foot/pounds or inch/pounds, to thereby provide a direct reading of the torque being transmitted by the shaft 11.

The shaft 11 includes two integral flanges 23 and 24 which are partially undercut by opposed circular recesses 25 (only one of which is shown).

The torsional forces represented by the arrows 13 cause the shaft 11 to twist slightly in proportion to the total torque which it is transmitting. The angle of relative rotational displacement between the flanges 23 and 24 is equal to the twist angle experienced by a central segment 26 of the shaft 11 extending between the end surfaces of the opposed undercut recesses 25.

The sleeve 12 is supported in concentric relation to the shaft 11 by an interference fit between an internal sleeve bore 27 and a peripheral cylindrical surface 28 of the flange 23. Since the portion of the surface 28 which is in radial alignment with the undercut 25 is isolated from torsional distortion of the shaft 11, there exists no slippage or creep between the shaft 11 and the sleeve 12.

The opposite unsupported end of the sleeve 12 surrounds the flange 24 and is of larger internal diameter than the outer diameter of that flange, so that no physical contact occurs between the sleeve and shaft members except at the joint provided by the bore 27 and the surface 28. It will be apparent, therefore, that the application of opposing torsional forces to the shaft 11 causes the unsupported end of the sleeve 12 to rotate relative to the flange 24 through the same rotational angle as that through which the central segment of the shaft is twisted. Consequently, the amount of torque transmitted by the shaft can be determined by measuring the relative rotational movement between the sleeve 12 and the flange 24. This is accomplished by means of two diametrically opposed sets of reference members (only one of which is shown herein) each of which comprises a radial air nozzle 30 and an opposed tangential restrictor member or anvil 31.

Each nozzle is supported in diametrically opposed, radial relation to the shaft 11 by being tightly pressed into a bore 32 in the flange 24.

Each nozzle 30 is provided with a lateral orifice 33 defined by a short orifice collar 34 projecting beyond a flat external surface 35. The orifice of each nozzle 30 communicates with a diametrically extending passageway 36 and the passageway 36 communicates with the passageway 15. Thus, air introduced into the passageway 15 from the conduit 16 and through the rotary seal 14 is conducted to both nozzle orifices.

Each anvil 31 is provided with a threaded shank 36 which is threaded through the collar 12 in coaxial alignment with the orifice 33. A flat end face 37 of each anvil is machined at right angles to the axis thereof and extends into a radial hole 38 in the sleeve 12 in parallel confronting relation to a face 39 of each orifice collar 34. The opposite end of each anvil is provided with a screwdriver slot 40 to allow the flow restriction characteristics of each nozzle to be adjusted by increasing or decreasing the small gap between the faces 37 and 39. The adjustment of the spacing between the faces is performed while the sensing unit is free from torsional influences to provide a predetermined air pressure in the conduit 16. Both sets of faces should be adjusted to have the same flow restricting characteristics to ensure that bending influences will not produce erroneous readings by the gauge 22.

After the adjustments have been made, a torsional load applied to the shaft 11 in the direction shown by the arrows 13 simultaneously reduces the gap between both pairs of confronting nozzles and anvils, thereby increasing the air pressure indicated by the gauge 22.

The arrangement thus far discussed with reference to the accompanying drawing is described in more detail in U.S. Pat. No. 3,710,618, the disclosure of which is incorporated herein by reference. In that patent, it is noted that the nozzle and restrictor members must be quite close together, and must move relative to each other through a correspondingly small distance. As an example, the confronting surfaces might be spaced from each other by about 0.002 inch when the unit is free from torsional forces and by about 0.001 inch when the unit is subjected to the maximum torque which it is intended to measure. Therefore, that unit could be subjected to approximately twice its maximum rated torque load before the reference surfaces would come into contact with each other. However, it is also noted that if the sensing unit were subjected to a torsional overload sufficient to drive the reference surfaces together, the accuracy of the instrument would almost certainly be destroyed, particularly if the torsional forces involved were sufficient to produce irreversible twisting of the shaft member.

Thus, the arrangement shown and described in that patent is an arrangement in which permanent damage may occur to either the nozzle member or the restrictor member, or both, and possibly to the members which mount the nozzle and anvil components. According to the present invention, the nozzle 30 and the anvil 31 may be closely spaced to provide proper variations in fluid pressure characteristics but at least one of the opposed members may be displaceable through a wide range of torque overload without permanent damage to other components.

Figure 2:
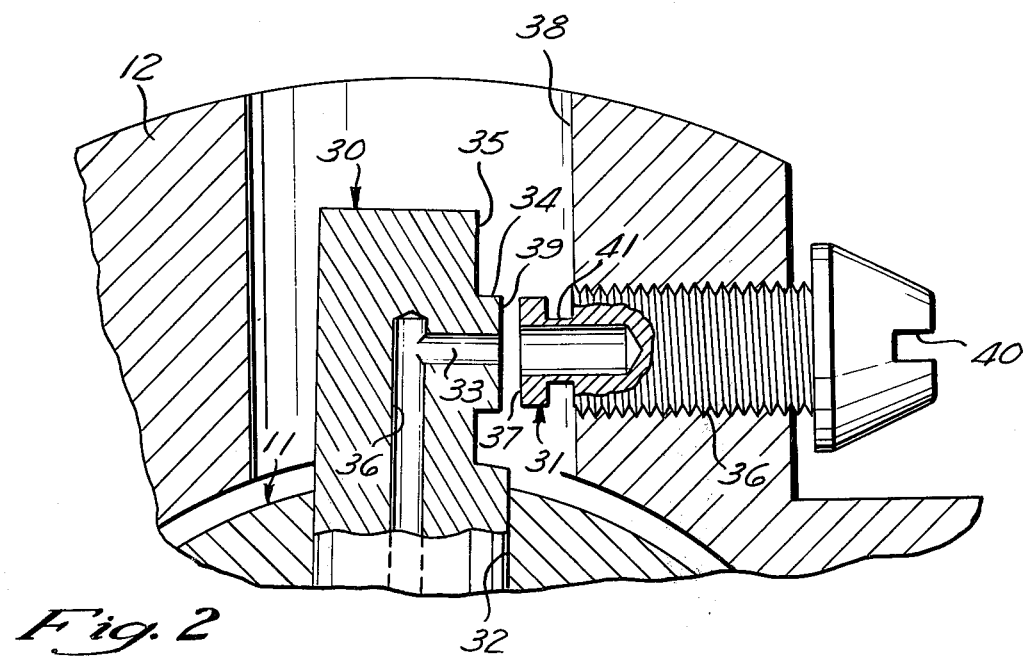
FIG. 2 is a fragmentary, cross sectional view, the plane of the section being indicated by the line 2—2 in FIG. 1.
Figure 3:
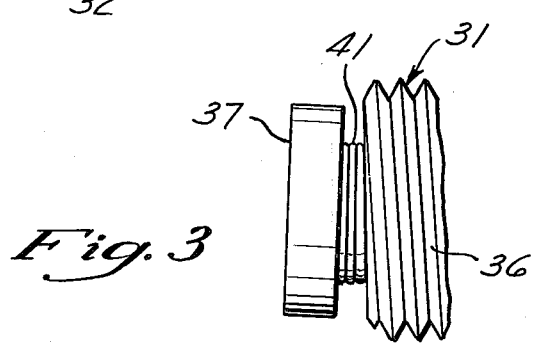
FIG. 3 is a fragmentary, elevational view illustrating the displacement of the anvil member caused by excessive torque.

As may be seen in FIGS. 2 and 3, the anvil member 31 is constructed so that it is displaceable. The anvil member 31 includes a narrowed neck portion 41 which comprises a thin, cylindrical sidewall portion of the anvil. The sidewall portion may have a thickness of about 0.005 so that if the shaft 11 is subjected to a substantial overload, the nozzle 30 may contact the face 37 and fold or crush the sidewall 41 in an accordian fashion, as is illustrated in FIG. 3. Thus, the torquemeter may be subjected to overloads of, for example, 800 percent, without damage to components other than the easily replaceable anvil 31. Theoretically, the neck portion 41 may be made much longer than the drawings indicate, but, as a practical matter, it need only accommodate overloads below those which would permanently twist the shaft 11.

It should be appreciated that the invention is not limited to a crushable or deformable anvil member, since the portion of the anvil member which projects into the hole 38 may be biased therein by a relatively strong spring so that, upon contact by the nozzle member, the spring will permit the projecting end of the anvil to be driven against the bias of the spring. Of course, the spring should be strong enough that it does not react to fluid pressure on the face of the anvil. Moreover, the invention is not limited to a displaceable anvil member, since the nozzle may include a replaceable insert which defines the orifice and which has a crushable wall portion or a springbiased member. Furthermore, the invention is not limited to torquemeters wherein a fluid is delivered to an orifice under constant pressure. Other arrangements may be provided which sense the spacing between the faces 37 and 39. For example, a vacuum may be drawn through the line 16 under a constant pressure and variations thereof may be sensed by a vacuum gauge.

In view of the foregoing, therefore, the invention is not restricted to the slavish imitation of each and every detail set forth above. Obviously, devices may be provided which change, eliminate, or add certain specific details without departing from the scope of the invention.

What is claimed is:

1. A torque sensing instrument comprising a torsion shaft, a fluid flow unit having a nozzle member adapted to conduct fluid, an anvil member spaced a predetermined distance from and facing said nozzle member for impeding flow therefrom or thereto, mounting means for supporting the members on the shaft with the nozzle member being supported from one location on the shaft and the anvil member being supported from another location axially spaced from said one location so that relative rotational movement occurs with torsion in the shaft, means for continuously moving fluid under constant pressure through the nozzle member, and pressure-responsive means indicating variations in pressure occurring at the nozzle member caused by changes in distance between the nozzle member and said anvil member as said members are moved through said predetermined distance by shaft rotation, at least one of said members including displaceable means permitting overload movement of the members toward each other beyond said predetermined distance to prevent deformation of surrounding structure, said displaceable means comprising a thinned neck section of one of said members.

2. A torque sensing unit according to claim 1, wherein said anvil member is provided with said thinned neck section.

3. A torque sensing instrument comprising a torsion shaft, a fluid flow unit having a nozzle member positioned to direct fluid in a direction substantially tangentially of the shaft axis, an anvil member spaced a predetermined distance from and facing said nozzle member for impeding flow therefrom, mounting means for supporting the members on the shaft with the nozzle member being supported from one location on the shaft and the anvil member being supported from another location axially spaced from said one location so that relative rotational movement occurs with torsion in the shaft, means for continuously delivering fluid under constant pressure to the nozzle member, and pressure-responsive means indicating variations in pressure occurring within said delivering means by back pressure caused by changes in distance between said nozzle member and said anvil member as said members are moved through said predetermined distance by shaft torsion, said anvil member including a thinned neck portion permitting overload movement of the members toward each other beyond said predetermined distance to prevent deformation of the nozzle member.

* * * * *